United States Patent
Iwama et al.

(10) Patent No.: US 9,564,640 B2
(45) Date of Patent: Feb. 7, 2017

(54) ELECTRODE CURRENT COLLECTOR AND METHOD FOR PRODUCING THE SAME, ELECTRODE FOR BATTERY AND METHOD FOR PRODUCING THE SAME, AND SECONDARY BATTERY

(75) Inventors: Masayuki Iwama, Fukushima (JP); Rikako Imoto, Fukushima (JP); Kenichi Kawase, Fukushima (JP); Akinori Kita, Fukushima (JP)

(73) Assignee: SONY CORPORATION, Tokyo (JP)

( * ) Notice: Subject to any disclaimer, the term of this patent is extended or adjusted under 35 U.S.C. 154(b) by 1024 days.

(21) Appl. No.: 11/767,754

(22) Filed: Jun. 25, 2007

(65) Prior Publication Data

US 2008/0220338 A1 Sep. 11, 2008

(30) Foreign Application Priority Data

Jun. 26, 2006 (JP) ................. 2006-174763

(51) Int. Cl.
- *H01M 4/62* (2006.01)
- *H01M 4/64* (2006.01)
- *H01M 10/052* (2010.01)
- *H01M 10/054* (2010.01)
- *H01M 4/66* (2006.01)
- *H01M 4/134* (2010.01)
- *H01M 4/1395* (2010.01)

(Continued)

(52) U.S. Cl.
CPC ............ *H01M 4/661* (2013.01); *H01M 4/134* (2013.01); *H01M 4/1395* (2013.01); *H01M 4/667* (2013.01); *H01M 10/052* (2013.01); *H01M 10/0569* (2013.01); *H01M 2004/021* (2013.01); *Y02E 60/122* (2013.01); *Y02P 70/54* (2015.11); *Y10T 428/31678* (2015.04)

(58) Field of Classification Search
CPC .......... H01M 4/64; H01M 4/82; H01M 4/667; H01M 10/052; H01M 10/059; Y02P 70/54; Y02E 60/122
USPC .... 429/209, 218.1, 342, 338, 517, 519, 522; 205/225, 227; 427/77
See application file for complete search history.

(56) References Cited

U.S. PATENT DOCUMENTS

| | | | |
|---|---|---|---|
| 6,051,340 A | 4/2000 | Kawakami et al. | |
| 6,153,077 A * | 11/2000 | Kato | C25D 1/04 205/77 |
| 6,432,579 B1 | 8/2002 | Tsuji et al. | |

(Continued)

FOREIGN PATENT DOCUMENTS

| | | |
|---|---|---|
| JP | 08-050922 | 2/1996 |
| JP | 2948205 | 2/1999 |

(Continued)

OTHER PUBLICATIONS

Japanese Patent Office Action corresponding to Japanese Serial No. 2006-174763 dated Dec. 1, 2009.

(Continued)

*Primary Examiner* — Ula C Ruddock
*Assistant Examiner* — Thomas Parsons
(74) *Attorney, Agent, or Firm* — Dentons US LLP

(57) ABSTRACT

A current collector forming an electrode for battery is provided. The electrode current collector includes a conductive layer made of copper or a copper alloy. Furthermore, the conductive layer has a plurality of crystallites, the crystallites containing crystallites having a cross-section area of 20 μm² or more.

31 Claims, 5 Drawing Sheets

(51) Int. Cl.
*H01M 10/0569* (2010.01)
*H01M 4/02* (2006.01)

(56) References Cited

U.S. PATENT DOCUMENTS 6,685,804 B1  2/2004  Ikeda et al.

FOREIGN PATENT DOCUMENTS

| | | | |
|---|---|---|---|
| JP | 11-135115 | | 5/1999 |
| JP | 2000200610 | | 7/2000 |
| JP | 2004-087158 | | 3/2004 |
| JP | 2004207113 | | 7/2004 |
| JP | 2004-349162 | * | 12/2004 |
| JP | 2005-135856 | * | 5/2005 |
| JP | 2005126779 | * | 5/2005 |
| JP | 2005135856 | | 5/2005 |
| WO | 01/29918 | | 4/2001 |

OTHER PUBLICATIONS

A Japanese Office Action dated Dec. 26, 2008 issued in connection with counterpart Japanese Patent Application No. 2006-135856.
Japanese Office Action dated Nov. 6, 2012 for Japanese Application No. 2010-011900.

* cited by examiner

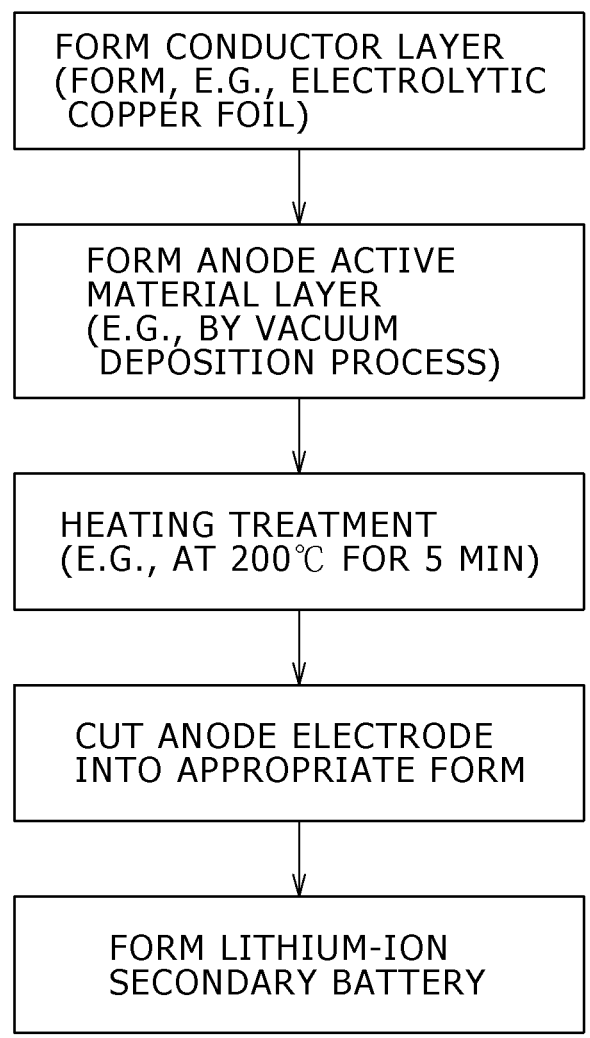

ELECTRODE CURRENT COLLECTOR AND METHOD FOR PRODUCING THE SAME, ELECTRODE FOR BATTERY AND METHOD FOR PRODUCING THE SAME, AND SECONDARY BATTERY

CROSS-REFERENCE TO RELATED APPLICATIONS

The present application contains subject matter related to Japanese Patent Application JP 2006-174763 filed in the Japanese Patent Office on Jun. 26, 2006, the entire contents of which being incorporated herein by reference.

BACKGROUND OF THE INVENTION

1. Field of the Invention

The present invention relates to an electrode current collector that may be advantageously used in, e.g., lithium secondary battery, and a method for producing the same, an electrode for battery and a method for producing the same, and a secondary battery. More particularly, the present invention relates to the improvement of discharge capacity and cycle characteristics.

2. Description of Related Art

In recent years, mobile devices are being improved in performance and increased in functions, and, in accordance with this tendency, demands are made on secondary batteries used as a power source of the mobile devices, in which the batteries should be reduced in size, weight, and thickness, and particularly should be increased in capacity.

As a secondary battery which can meet the demands, there is a lithium-ion secondary battery. The lithium-ion secondary battery has battery properties which sharply change depending on the electrode active material used and the like. In a typical lithium-ion secondary battery being practically used, lithium cobalt oxide is used as a cathode (positive electrode) active material and graphite is used as an anode (negative electrode) active material, and the lithium-ion secondary battery having such constituents has a battery capacity reaching the theoretical capacity, and hence it is difficult to drastically increase the battery capacity by the further improvement.

For achieving a lithium-ion secondary battery having a capacity drastically increased, studies are made on the use of silicon or tin which is capable of forming an alloy together with lithium during the charging as an anode active material. However, when silicon or tin is used as an anode active material, expansion or shrinkage caused during the charging or discharging is large, and therefore the expansion or shrinkage caused during the charging or discharging causes the active material to be finely divided or to be removed from the current collector, leading to an issue of lowering of the cycle characteristics.

On the other hand, in recent years, an anode electrode including an anode active material layer made of silicon or the like stacked on an anode current collector has been proposed (see, for example, Japanese Patent Application Publication No. Hei 08-50922, Japanese Patent No. 2948205, and Japanese Patent Application Publication No. Hei 11-135115). This anode electrode is considered to unify the anode active material layer and the anode current collector, preventing the active material from being finely divided due to the expansion or shrinkage caused during the charging or discharging. Further, there can be obtained an advantage in that the electron conduction of the anode electrode is improved.

In patent document 1 (International Patent Publication No. WO01/029918, page 9), there is a description showing that, from the viewpoint of improving the adhesion between the anode active material layer and the current collector, the current collector for anode electrode on which an anode active material layer made of silicon or the like is stacked is preferably made of a metal capable of forming an alloy together with the anode active material layer, and, when silicon and germanium layers are stacked on the current collector, the current collector for anode electrode is especially preferably made of copper. In addition, there is a description showing that an electrolytic copper foil having a large surface roughness Ra is preferred as a copper foil. The electrolytic copper foil is a copper foil having both surfaces roughened, which is obtained by immersing a copper foil, such as a rolled copper foil, in an electrolytic bath to permit copper fine particles to be deposited on both surfaces of the copper foil by an electrolytic process.

SUMMARY OF THE INVENTION

However, even the anode electrode having the anode active material layer unified with the anode current collector formed by an improved production method poses an issue such that, as the cycle of charging and discharging is repeated, large expansion and shrinkage of the anode active material layer apply stresses to the current collector, so that the electrode is deformed or destroyed with the current collector included therein, thus making it difficult to obtain satisfactory cycle characteristics.

Accordingly, it is desirable to provide an electrode current collector that may be advantageously used in, e.g., lithium secondary battery, and a method for producing the same, in which the electrode current collector is advantageous in that stresses applied to the current collector during the charging or discharging are reduced to improve the charge-discharge cycle characteristics including the initial discharge capacity and capacity retention ratio; an electrode for battery and a method for producing the same; and a secondary battery using the electrode. The present invention is made in view of the above issues.

In an embodiment of the present invention, there is provided a first current collector forming an electrode for battery, the first electrode current collector having a conductive layer made of copper or a copper alloy, wherein the conductive layer has a plurality of crystallites, the crystallites containing crystallites having a cross-section area of 20 μm$^2$ or more, or a second current collector forming an electrode for battery, the second electrode current collector having a conductive layer made of copper or a copper alloy, wherein the conductive layer has a plurality of crystallites formed by heating.

In another embodiment of the present invention, there is provided a method for producing the first or second electrode current collector, the method including:

forming by an electrolytic process a conductor layer for forming the conductive layer; and subjecting the resultant conductor layer to heating to form the conductive layer.

In another embodiment of the present invention, there is provided an electrode for battery including the above electrode current collector; a first method for producing the electrode for battery, wherein the method includes the step of forming an active material layer on the electrode current collector; and a second method for producing the electrode for battery, wherein the method includes the steps of: forming an active material layer on a conductor layer for forming the conductive layer; and subjecting the conductor layer having formed thereon the active material layer to heating to form the conductive layer. Further, in another embodiment of the present invention, there is provided a secondary battery including the above electrode for battery as an anode electrode.

The method for producing the electrode current collector according to the embodiment of the present invention has a step for forming by an electrolytic process a conductor layer for forming the conductive layer and a step for subjecting the resultant conductor layer to heating to form the conductive layer. Accordingly, the heating can increase the grain size of the crystallites constituting the conductive layer.

The second electrode current collector according to the embodiment of the present invention has a structural characteristic feature, obtained by the method for producing the electrode current collector, such that the conductive layer is made of crystallites having an increased grain size, as compared to a related art conductor layer using a conductor layer which is not subjected to the heating. The first electrode current collector of the embodiment has a characteristic feature such that the crystallites constituting the cross-section of the conductive layer contain crystallites having a cross-section area of 20 $\mu m^2$ or more.

In the electrode for battery of according to the embodiment of the present invention, the current collector constituting the electrode for battery has the conductive layer made of crystallites having an increased grain size. Therefore, strain in the crystallites in the current collector caused due to the expansion or compression during the charging or discharging is reduced, so that the strain on the electrode for battery caused during the charge-discharge cycle is reduced, thus improving the charge-discharge cycle characteristics including the capacity retention ratio.

The electrode for battery according to the embodiment of the present invention has the structural characteristic feature obtained by the method for producing the electrode, and hence the electrode for battery is unlikely to suffer structure breakage in the expansion of the active material layer caused during the charging. For this reason, the resultant battery is excellent in the cycle characteristics including the charge capacity and capacity retention ratio. Consequently, a simple substance of silicon or tin can be used as an anode active material, thus achieving a battery having high capacity. The secondary battery of the embodiment has this electrode for battery and hence has the same characteristic feature.

Each of the first method and second method for producing the electrode for battery according to the embodiments of the present invention can be individually employed and can ensure the production of the above-mentioned electrode for battery.

BRIEF DESCRIPTION OF THE DRAWINGS

FIG. 3 is a flowchart showing the process for forming a lithium-ion secondary battery according to a second embodiment of the present invention;

DETAILED DESCRIPTION OF EMBODIMENTS

Figure 1:
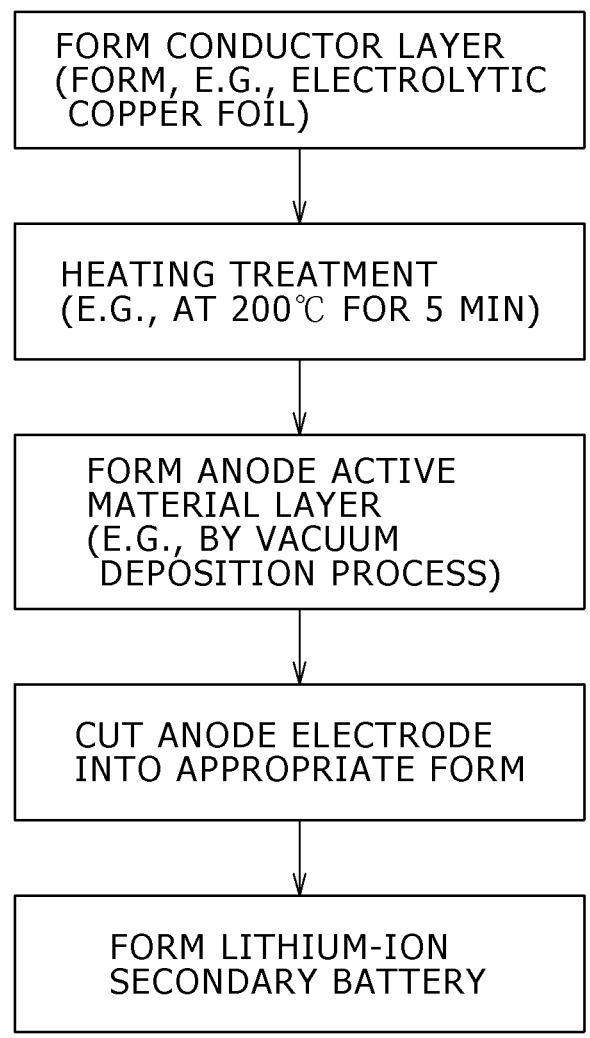
FIG. 1 is a flowchart showing the process for forming a lithium-ion secondary battery according to a first embodiment of the present invention.

In an electrode current collector according to an embodiment of the present invention, the crystallites preferably contain crystallites having a cross-section area of 20 $\mu m^2$ or more in an area ratio of 30% or more. When this requirement is satisfied, the capacity retention ratio is remarkably improved as shown below in Example 2. Further, the crystallites preferably contain crystallites having a cross-section area of 50 $\mu m^2$ or more. When this requirement is satisfied, the capacity retention ratio is remarkably improved as seen from the below comparison between Examples 1-1 and 1-2. These cases are examples in which, by virtue of the increased grain size of the crystallites in the current collector, strain in the crystallites in the current collector caused due to the expansion or compression during the charging or discharging is reduced, thus improving the charge-discharge cycle characteristics including the capacity retention ratio.

It is preferred that the conductive layer contains therein pores, wherein the pores are present at an average pore density (the number of pores/cross-section area) of 0.001 to 1.00 pores/$\mu m^2$ in an arbitrary cross-section of the conductive layer. By virtue of the pores contained in the conductive layer, stresses applied to the current collector due to the expansion or shrinkage caused during the charging or discharging are relaxed. In this case, the pores preferably contain pores having a pore diameter of 0.5 to 3.0 $\mu m$ and being present at an average pore density of 0.01 to 0.05 pores/$\mu m^2$ in an arbitrary cross-section of the conductive layer, at least part of the pores are preferably present in a joint portion of the crystallites joined to each other, or at least part of the pores preferably have a size smaller than the size of the surrounding crystallites and have a pore diameter of 0.01 to 10 $\mu m$.

The crystallites preferably contain a crystallite continuously forming the conductive layer from the surface to the back surface of the conductive layer. The reason for this is not completely clear, but it is presumed that the stresses applied to the crystallites are relaxed, so that the conductive layer is prevented from suffering structure breakage.

It is preferred that the conductive layer has a surface having fixed thereto fine particles made of copper or a copper alloy, in which the surface is roughened by the fine particles, in which at least part of the fine particles are fixed to one crystallite constituting the conductive layer. In this case, the fine particles and the crystallite to which the particles are fixed unify and are strongly joined together, and therefore there can be achieved stronger adhesion between the current collector and the active material layer formed in contact with the surface of the conductive layer having fixed thereto the fine particles.

The conductive layer is preferably made of an electrolytic copper foil treated by heating. In the electrolytic copper foil, the above-mentioned fine particles are formed on the surface by an electrolytic treatment, roughening the surface. In this case, the electrolytic copper foil is preferably an electrolytic copper foil exhibiting an X-ray diffraction spectrum in which the ratio of an intensity I (220) of a peak ascribed to the (220) crystal face diffraction to an intensity I (200) of a peak ascribed to the (200) crystal face diffraction satisfies the relationship: I (220)/I (200)>1. When using this electrolytic copper foil, the effect of the heating treatment in the present invention is remarkable as shown below in the Examples.

In the method for producing the electrode current collector according to an embodiment of the present invention, the heating is preferably conducted at a temperature of 400° C. or higher. For changing the crystal structure of the electrode current collector made of, e.g., copper having a high melting point, the heating needs a temperature as high as 400° C. or higher. In this case, for avoiding an unfavorable reaction, such as oxidation of the electrode current collector, the heating is preferably conducted in an atmosphere of chemically inert gas.

The electrode for battery according to an embodiment of the present invention preferably has an active material layer containing at least one substance selected from the group consisting of metallic lithium, metallic tin, a tin compound, a silicon simple substance, and a silicon compound.

In this case, it is preferred that, in at least part of the interface region between the electrode current collector and the active material layer, crystallites in which the constituent of the electrode current collector and the constituent of the active material layer diffuse into each other are present, and it is especially preferred that the active material layer is made of silicon. In this case, there can be achieved stronger adhesion between the electrode current collector and the active material layer.

The active material layer made of silicon preferably contains oxygen as a constituent element in an amount of 3 to 40 atomic %. In this case, the active material layer preferably has a region having a high oxygen concentration and being distributed in substantially the longitudinal direction of the electrode current collector.

In the second method for producing the electrode for battery according to an embodiment of the present invention, the heating is preferably conducted at a temperature of 500° C. or lower within 5 minutes. In this method, the active material layer is formed in contact with the electrode current collector, and then the electrode current collector is subjected to heating. Therefore, for preventing the electrode current collector and active material layer from alloying to excess, the heating needs to be conducted at a relatively low temperature in a short time, as compared to those in the first method for producing the electrode for battery according to an embodiment of the present invention.

The secondary battery according to an embodiment of the present invention is preferably a lithium secondary battery. In this case, the secondary battery preferably includes an electrolyte containing a solvent obtained by fluorinating part of or all of hydrogens of at least one carbonate selected from a cyclic carbonate and a chain carbonate.

Further, the electrolyte preferably contains propenesultone. In this case, a side reaction caused during the charging or discharging is suppressed, thus preventing lowering of the cycle characteristics due to the deformation of the battery form caused by gas expansion or the like.

Hereinbelow, the embodiments of the present invention will be described in detail with reference to the accompanying drawings.

First Embodiment

In the present embodiment, an example is described in which an electrode current collector is formed by the method for producing an electrode current collector according to an embodiment of the present invention and a lithium-ion secondary battery is formed using as an anode electrode an electrode for battery including the above-formed electrode current collector.

FIG. 1 is a flowchart showing the process for forming a lithium-ion secondary battery according to the present embodiment. First, a conductor layer for forming a conductive layer constituting an anode current collector, for example, an electrolytic copper foil is formed by an electrolytic process.

Then, the resultant conductor layer is subjected to heating to form a conductive layer. In this instance, the heating is preferably conducted at a temperature of 200° C. or higher for 5 minutes or longer. The heating is preferably conducted in an atmosphere of chemically inert gas, for example, in argon gas or nitrogen gas, or in a vacuum.

Next, an anode active material layer is formed on the thus formed anode current collector. With respect to the method for forming the anode active material layer, there is no particular limitation as long as an anode active material layer can be formed on the surface of the current collector. Examples of the methods include a vapor phase method, a spray coating method, a calcination method, and a liquid phase method. As a vapor phase method, a vacuum deposition process, a sputtering process, an ion plating process, a laser ablation process, or a chemical vapor deposition (CVD) process may be used, or a spray coating method may be used. As an example of a liquid phase method, there can be mentioned plating. Alternatively, an anode active material layer may be formed by a combination of the above two or more methods or a combination of the above method(s) and another method.

Subsequently, the anode electrode is cut into an appropriate form, and then a lithium secondary battery is formed.

Figure 2:
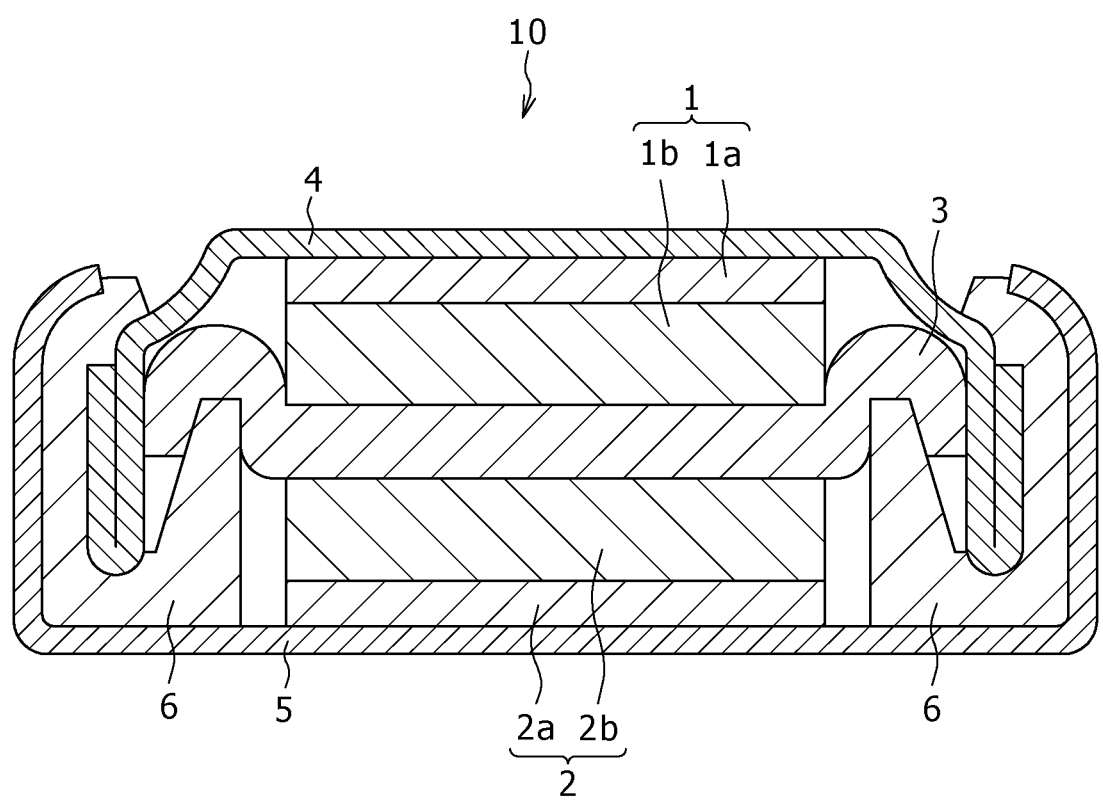
FIG. 2 is across-sectional view showing the construction of the (coin-type) lithium-ion secondary battery.

FIG. 2 is a cross-sectional view showing the construction of a lithium-ion secondary battery 10 according to an embodiment of the present invention. The secondary battery 10 is of a so-called coin type, and includes an anode electrode (negative electrode) 1 contained in a packaging cup 4 and a cathode electrode (positive electrode) 2 contained in a packaging can 5, which are stacked through a separator 3. The edges of the packaging cup 4 and packaging can 5 are crimped with an insulating gasket 6 to close the battery. Each of the packaging cup 4 and the packaging can 5 is made of a metal, such as stainless steel or aluminum (Al).

The anode electrode 1 includes, for example, an anode current collector 1a, and an anode active material layer 1b formed on the anode current collector 1a.

The anode current collector 1a is preferably formed from a metal material which does not form an intermetallic compound together with lithium (Li). When the anode current collector 1a is formed from a material which forms an intermetallic compound together with lithium, a reaction of the material with lithium advanced during the charging or discharging causes the anode current collector 1a to undergo expansion or shrinkage. Consequently, the anode current collector 1a suffers structure breakage, lowering the current collection properties. Further, the ability of the current collector to bond with the anode active material layer 1b becomes poor, so that the anode active material layer 1b is likely to be removed from the anode current collector 1a.

Examples of metal elements which do not form an intermetallic compound together with lithium include copper (Cu), nickel (Ni), titanium (Ti), iron (Fe), and chromium (Cr). In the present specification, the metal material involves a single substance of a metal element and an alloy of two or more metal elements or at least one metal element and at least one semi-metal element.

The anode current collector 1a is preferably made of a metal material including a metal element capable of forming an alloy together with the anode active material layer 1b. In this case, the formation of an alloy improves the adhesion between the anode active material layer 1b and the anode current collector 1a, and hence the anode active material is prevented from being finely divided due to the expansion or shrinkage caused during the charging or discharging, thus preventing the anode active material layer 1b from being removed from the anode current collector 1a. In addition, there can be obtained an advantage in that the electron conduction of the anode electrode is improved.

The anode current collector 1a may be made of either a single layer or a plurality of layers. When the anode current collector is formed with a plurality of layers, it is preferred that the layer in contact with the anode active material layer 1b is made of a metal material capable of forming an alloy together with silicon and the other layer(s) is (are) made of a metal material which does not form an intermetallic compound together with lithium.

The surface of the anode current collector 1a on which the anode active material layer 1b will be formed is preferably roughened, and, for example, the anode current collector 1a preferably has a surface roughness Ra of 0.1 μm or more. In this case, the adhesion between the anode active material layer 1b and the anode current collector 1a is improved. The Ra value is preferably 3.5 μm or less, more preferably 3.0 μm or less. When the surface roughness is too large, there is a danger that a crack is likely to be formed in the anode current collector 1a due to expansion of the anode active material layer 1b. The surface roughness Ra means an arithmetic average roughness Ra prescribed in JIS B0601. The region of the anode current collector 1a on which the anode active material layer 1b is formed may have a surface roughness Ra within the above range.

The anode active material layer 1b contains as an anode active material at least one member selected from a simple substance of silicon and a compound thereof, and a simple substance of tin and a compound thereof, and especially preferably contains silicon. Silicon has both excellent ability to form an alloy together with lithium ions and excellent ability to extract lithium ions from the alloyed lithium, and, when silicon is used for forming a lithium-ion secondary battery, a secondary battery having a large energy density can be achieved. Silicon may be contained in any form of a simple substance, an alloy, a compound, and a mixture thereof.

The anode active material layer 1b is of a thin film type having a thickness of about 5 to 6 μm. The anode active material layer 1b made of at least one member selected from a simple substance of silicon and a compound thereof, and a simple substance of tin and a compound thereof is formed on the anode current collector 1a.

In this case, part of or all of the simple substance of silicon or tin and the current collector constituting the anode electrode preferably together form an alloy. In such a case, the adhesion between the anode active material layer 1b and the anode current collector 1a can be improved as mentioned above. Specifically, it is preferred that, at the interface, the constituent element of the anode current collector 1a diffuses into the anode active material layer, the constituent element of the anode active material layer diffuses into the anode current collector 1a, or these elements diffuse into each other. In this case, even when the anode active material layer 1b undergoes expansion or shrinkage due to the charging or discharging, the anode active material layer is prevented from being removed from the anode current collector 1a. In the present invention, the diffusion of the elements is included in the alloying as one mode.

When the anode active material layer 1b contains a simple substance of tin, a cobalt layer is stacked on the tin layer and the stacked layers may be subjected to heating so that they together form an alloy. In this case, the charging-discharging efficiency is increased, thus improving the cycle characteristics. The reason for this is not clear, but it is presumed that, by virtue of containing cobalt which does not react to lithium, the tin layer is improved in structure stability during the repeated charge-discharge reaction.

When the anode active material layer 1b contains a simple substance of silicon, as examples of metal elements which do not form an intermetallic compound together with lithium and which form an alloy together with the silicon contained in the anode active material layer 1b, there can be mentioned copper, nickel, and iron. Of these, copper is especially preferably used as a material since the anode current collector 1a having satisfactory strength and electrical conduction properties can be obtained.

As the copper foil, an electrolytic copper foil having a large surface roughness Ra is preferred. It is noted that this electrolytic copper foil is not the electrolytic copper foil having roughened surfaces obtained from a rolled copper foil by an electrolytic treatment mentioned above in the section of "Description of Related Art". The rolled copper foil cannot be controlled in crystallite size by heating. The electrolytic copper foil preferably used in the present embodiment is a copper foil having both surfaces roughened by immersing a copper foil obtained by an electrolytic process in an electrolytic bath to permit copper fine particles to be deposited on the surfaces, and further is an electrolytic copper foil exhibiting an X-ray diffraction spectrum in which the ratio of an intensity I (220) of a peak ascribed to the (220) crystal face diffraction to an intensity I (200) of a peak ascribed to the (200) crystal face diffraction satisfies the relationship: I (220)/I (200)>1. When using this electrolytic copper foil, the effect of the heating treatment in the present invention is remarkable as shown below in the Examples. The copper foil has a thickness of, for example, about 12 to 30 μm.

The anode active material layer 1b preferably contains oxygen as a constituent element. Oxygen can suppress expansion and shrinkage of the anode active material layer 1b and prevent the lowering of the discharge capacity and the expansion. It is preferred that at least part of the oxygen contained in the anode active material layer 1b is bonded to silicon, and the silicon bonded may be present in the form of silicon monoxide or silicon dioxide or in another metastable state.

It is preferred that the oxygen content of the anode active material layer 1b is in the range of from 3 to 45 atomic %. When the oxygen content is less than 3 atomic %, the effect aimed at by adding oxygen to the layer cannot be obtained. On the other hand, when the oxygen content is more than 45 atomic %, it is considered that the energy capacity of the battery is lowered, and further the resistance of the anode active material layer 1b is increased, so that local insertion of lithium causes expansion or the cycle characteristics become poor. A film formed on the surface of the anode active material layer 1b due to decomposition of the electrolytic solution and the like during the charging or discharging is not included in the anode active material layer 1b. Therefore, the oxygen content of the anode active material layer 1b is a value determined by calculation excluding this film.

It is preferred that the anode active material layer 1b is formed by alternately stacking a first layer having a smaller oxygen content and a second layer having an oxygen content larger than that of the first layer, and at least one second layer is preferably present between the first layers. In this case, the occurrence of expansion or shrinkage caused during the charging or discharging can be prevented more effectively. For example, in the first layer, the silicon content is preferably 90 atomic % or more, and oxygen may be either contained or not contained, but the oxygen content is preferably smaller, and it is more preferred that no oxygen is contained or the oxygen content is very slight. In this case, a higher discharge capacity can be obtained. On the other hand, in the second layer, it is preferred that the silicon content is 90 atomic % or less and the oxygen content is 10 atomic % or more. In this case, structure breakage caused due to the expansion or shrinkage can be prevented more effectively. The first layer and the second layer may be stacked either in the order of first layer and second layer or in the order of second layer and first layer from the side of the anode current collector 1a, and either the first layer or the second layer may constitute the surface. Further, it is preferred that the oxygen content changes stepwise or continuously between the first layer and the second layer. When the oxygen content suddenly changes, the diffusion of lithium ions may be poor, thus increasing the resistance.

The anode active material layer 1b may contain at least one constituent element other than silicon and oxygen. Examples of such elements include cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), antimony (Sb), and chromium (Cr).

The cathode electrode 2 includes, for example, a cathode current collector 2a, and a cathode active material layer 2b formed on the cathode current collector 2a.

The cathode current collector 2a is preferably made of a metal material, such as aluminum, nickel, or stainless steel.

The cathode active material layer 2b preferably contains, for example, as a cathode active material, at least one material which is capable of extracting lithium ions during the charging and re-occluding lithium ions during the discharging, and optionally a conductor, such as a carbon material, and a binder, such as polyvinylidene fluoride.

As a material capable of extracting and re-occluding lithium ions, preferred is a lithium-transition metal compound oxide including lithium and a transition metal element M, and being represented by, e.g., the general formula: $Li_xMO_2$. When the lithium-transition metal compound oxide is used in a lithium-ion secondary battery, the oxide can generate high electromotive force, and has a high density and hence can further increase the capacity of the secondary battery. In the above formula, M represents at least one transition metal element, preferably, e.g., at least one element selected from cobalt and nickel, and x varies depending on the charged state (or discharged state) of the battery, and is generally a value in the range of $0.05 \leq x \leq 1.10$. Specific examples of the lithium-transition metal compound oxides include $LiCoO_2$ and $LiNiO_2$.

When a particulate lithium-transition metal compound oxide is used as a cathode active material, either the powder may be used as it is, or at least part of the particulate lithium-transition metal compound oxide may have formed a surface layer including at least one member selected from the group consisting of an oxide having a composition different from that of the lithium-transition metal compound oxide, a halide, a phosphate, and a sulfate. In the latter case, the stability can be improved, making it possible to more surely suppress the lowering of the discharge capacity. In this case, the constituent element of the surface layer and the constituent element of the lithium-transition metal compound oxide may diffuse into each other.

The cathode active material layer 2b preferably contains at least one member selected from the group consisting of a simple substance and a compound of an element belonging to Group 2, Group 3, or Group 4 of the long-form periodic table. In this case, the stability can be improved, making it possible to more surely suppress the lowering of the discharge capacity. Examples of the elements belonging to Group 2 include magnesium (Mg), calcium (Ca), and strontium (Sr), and especially preferred is magnesium. Examples of the elements belonging to Group 3 include scandium (Sc) and yttrium (Y), and especially preferred is yttrium. Examples of the elements belonging to Group 4 include titanium and zirconium (Zr), and especially preferred is zirconium. The above element may be present either in the form of a solid solution in the cathode active material or in the form of a simple substance or compound at the grain boundary of the cathode active material.

The separator 3 separates the anode electrode 1 from the cathode electrode 2 and prevents short-circuiting of current caused due to the contact of these electrodes, and permits lithium ions to pass through it. As a material for the separator 3, preferred is, for example, a thin membrane of microporous polyethylene or polypropylene having formed therein a number of micropores.

The separator 3 is impregnated with an electrolytic solution which is a liquid electrolyte. The electrolytic solution includes, for example, a solvent and an electrolyte salt dissolved in the solvent, and may contain an additive if necessary.

Examples of solvents used in the electrolytic solution include non-aqueous solvents, e.g., cyclic carbonates, such as 1,3-dioxolan-2-one (ethylene carbonate; EC) and 4-methyl-1,3-dioxolan-2-one (propylene carbonate; PC), and chain carbonates, such as dimethyl carbonate (DMC), diethyl carbonate (DEC), and ethylmethyl carbonate (EMC). These solvents may be used individually, but the two solvents or more are preferably used in combination. For example, when a high-permittivity solvent, such as ethylene carbonate or propylene carbonate, and a low-viscosity solvent, such as dimethyl carbonate, diethyl carbonate, or ethylmethyl carbonate, are used in combination, high dissolving power for an electrolyte salt and high ion conduction can be achieved.

The solvent may contain sultone. In this case, the electrolytic solution is improved in stability, making it possible to prevent the battery from suffering expansion due to the decomposition reaction. As the sultone, one having an unsaturated bond in its ring is preferred, and 1,3-propenesultone represented by the formula (1) below is especially preferred. This sultone exhibits more remarkable effect.

[Formula 1]

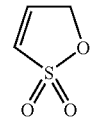

(1)

It is preferred that a cyclic carbonate having an unsaturated bond, such as 1,3-dioxol-2-one (vinylene carbonate; VC) or 4-vinyl-1,3-dioxolan-2-one (VEC), is mixed into the solvent. In this case, the lowering of the discharge capacity can be more surely suppressed. It is especially preferred that VC and VEC are used in combination since more remarkable effect can be obtained.

Further, a carbonate derivative having a halogen atom may be mixed into the solvent. In such a case, the lowering of the discharge capacity can be suppressed. In this case, it is more preferred that the carbonate derivative having a halogen atom and a cyclic carbonate having an unsaturated bond are used in combination. In such a case, more remarkable effect can be obtained. The carbonate derivative having a halogen atom may be either a cyclic compound or a chain compound, but preferred is a cyclic compound which exhibits more remarkable effect. Examples of such cyclic compounds include 4-fluoro-1,3-dioxolan-2-one (FEC), 4-chloro-1,3-dioxolan-2-one, 4-bromo-1,3-dioxolan-2-one, and 4,5-difluoro-1,3-dioxolan-2-one (DFEC), and, of these, preferred is DFEC or FEC having a fluorine atom, and especially preferred is DFEC which exhibits more remarkable effect.

Examples of electrolyte salts contained in the electrolytic solution include lithium salts, such as lithium hexa fluorophosphate ($LiPF_6$) and lithium tetra fluoroborate ($LiBF_4$). These electrolyte salts may be used individually or in combination.

The electrolytic solution may be either used as it is or used in the form of a so-called gel electrolyte which is made of a polymer compound having the electrolytic solution. In the latter case, the separator 3 may be impregnated with the electrolyte, or the electrolyte may be present in the form of a layer disposed between the separator 3 and the anode electrode 1 or cathode electrode 2. As the polymer material, preferred is, for example, a polymer containing vinylidene fluoride, which has high oxidation-reduction stability. As the polymer compound, preferred is a compound formed by polymerization of a polymerizable compound. Examples of polymerizable compounds include monofunctional acrylates, such as an acrylate; monofunctional methacrylates, such as a methacrylate; polyfunctional acrylates, such as a diacrylate and a triacrylate; polyfunctional methacrylates, such as a dimethacrylate and a trimethacrylate; acrylonitrile; and methacrylonitrile, and, of these, preferred is an ester having an acrylate group or a methacrylate group, which easily undergoes polymerization and has high polymerizable compound reactivity.

The lithium-ion secondary battery 10 can be produced, for example, as follows.

First, as mentioned above, the anode active material layer 1b is formed on the anode current collector 1a to form an anode electrode 1.

When the anode active material layer 1b contains oxygen, the oxygen content of the anode active material layer is controlled by, for example, adding oxygen to the atmosphere used for forming the anode active material layer 1b, adding oxygen to the atmosphere for the calcination or heating, or changing the oxygen concentration of the anode active material particles used.

When the anode active material layer 1b is formed by alternately stacking a first layer having a smaller oxygen content and a second layer having an oxygen content larger than that of the first layer as mentioned above, the oxygen content of the anode active material layer may be controlled by changing the oxygen concentration of the atmosphere, or the first layer is formed and then the surface of the first layer may be oxidized to form the second layer.

The anode active material layer 1b is formed and then, the resultant current collector may be subjected to heat treatment in a vacuum atmosphere or in an non-oxidative atmosphere to further alloy the interface between the anode current collector 1a and the anode active material layer 1b.

Then, the cathode active material layer 2b is formed on the cathode current collector 2a. For example, a cathode active material and optionally a conductor and a binder are mixed with one another to prepare a composition, and the composition is dispersed in a dispersing medium, such as NMP, to form a composition in a slurry state, and the composition slurry is applied to the cathode current collector 2a, and then subjected to compression molding to form a cathode electrode 2.

Next, the anode electrode 1, the separator 3, and the cathode electrode 2 are stacked on one another, and placed in a packaging cup 4 and a packaging can 5, and an electrolytic solution is charged, and the packaging cup and packaging can are caulked to assemble a lithium-ion secondary battery 10. In this instance, the anode electrode 1 and the cathode electrode 2 are arranged so that the anode active material layer 1b faces the cathode active material layer 2b.

When the assembled lithium-ion secondary battery 10 is charged, lithium ions are extracted from the cathode electrode 2, and move through the electrolytic solution toward the anode electrode 1 and are reduced at the anode electrode 1, and the resultant lithium forms an alloy together with the anode active material and thus is taken in the anode electrode 1. When the battery is discharged, the lithium taken in the anode electrode 1 is extracted again as lithium ions, and the lithium ions move through the electrolytic solution toward the cathode electrode 2 and occluded again in the cathode electrode 2.

In the lithium-ion secondary battery 10, a simple substance or a compound of silicon is contained in the anode active material layer as an anode active material, and therefore the secondary battery can be increased in capacity. In addition, the anode electrode in the present embodiment has the structural characteristic feature obtained by the method for producing the electrode, and hence the electrode for battery is unlikely to suffer structure breakage in expansion of the active material layer caused during the charging. For this reason, the lithium-ion secondary battery is excellent in the cycle characteristics including the charge capacity and capacity retention ratio.

Second Embodiment

In the present embodiment, an example is described in which an electrode for battery is formed using a related art electrode current collector, which is not treated by heating, and then the electrode for battery is subjected to heating, and a lithium-ion secondary battery is formed using as an anode electrode the electrode for battery treated by heating.

FIG. 3 is a flowchart showing the process for forming a lithium-ion secondary battery according to the present embodiment. First, a conductor layer for forming a conductive layer constituting an anode current collector, for example, an electrolytic copper foil is formed by an electrolytic process.

Next, an anode active material layer is formed on the anode current collector. The method for forming the anode active material layer is similar to that used in the first embodiment.

Then, the conductor layer of the anode current collector having formed thereon the anode active material layer is subjected to heating to form a conductive layer. In this instance, the heating is preferably conducted at a temperature of 200° C. or higher for 5 minutes or longer. The heating is preferably conducted in an atmosphere of chemically inert gas, for example, in argon gas or nitrogen gas, or in a vacuum.

Subsequently, the anode electrode is cut into an appropriate form, and then a lithium secondary battery is formed.

EXAMPLES

Hereinbelow, the present invention will be descried in more detail with reference to the following Examples. In the following Examples, the same reference numerals and characters as those used in the above descriptions of the embodiments are used.

In Examples 1-1 and 1-2, according to the process described in the first embodiment, an anode current collector material was first subjected to heating (annealing) to form an anode current collector, and then silicon (simple substance of silicon) was deposited on the current collector as an anode active material to form an anode electrode 1. Using the anode electrode 1, a coin-type test lithium-ion secondary battery having the same structure as that of the lithium-ion secondary battery 10 shown in FIG. 2 was prepared, and a capacity retention ratio was measured.

Example 1-1

In Example 1-1, an electrolytic copper foil having a surface roughened by an electrolytic treatment and having a thickness of 20 μm was used as an anode current collector material, and the anode current collector material was first subjected to heating such that the material was kept in an argon gas atmosphere of a calcination furnace at 500° C. for 10 hours. Then, a silicon layer having a thickness of 6 μm was formed on the heating-treated electrolytic copper foil by a vacuum deposition process using a deflecting electron beam evaporation source, thus forming an electrode for battery.

Figure 4A:
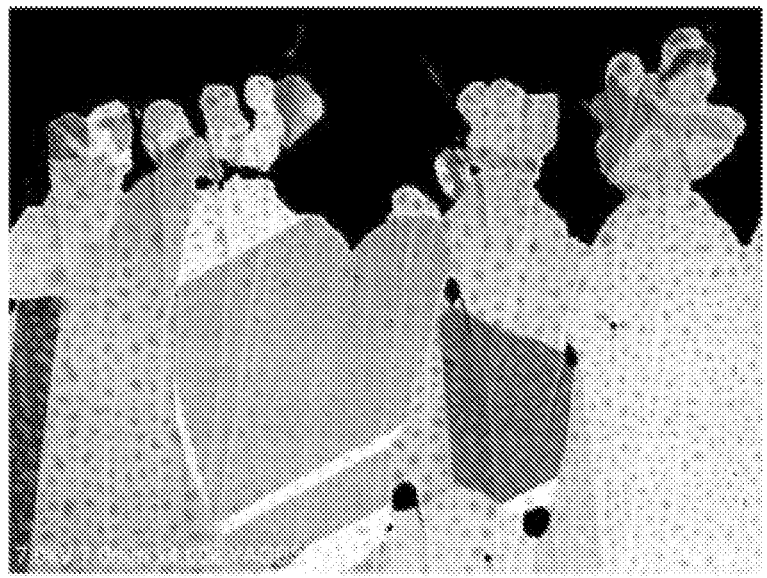
FIGS. 4A and 4B are scanning electron photo micrographs of the cross-sections of the electrolytic copper foil after the heating and the electrolytic copper foil before the heating in Example 1-1 of the present invention.
Figure 4B:
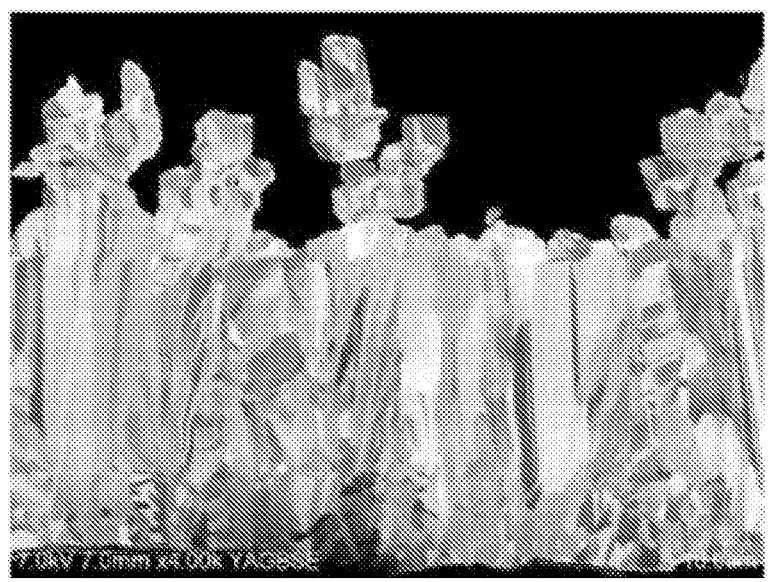

FIGS. 4A and 4B are photographs of the cross-section structures of electrolytic copper foils examined under a scanning electron microscope, in which the cross-sections are individually obtained by cutting by means of a microtome the electrolytic copper foil after the heating (FIG. 4A) and the electrolytic copper foil before the heating (FIG. 4B). From a comparison between FIGS. 4A and 4B, it is apparent that the heating causes the crystallites constituting the electrolytic copper foil to change in size.

The electrolytic copper foil treated by heating has the following characteristic cross-section structure. First, the crystallites had an average cross-section size of about 100 μm². The photograph has confirmed that part of the crystallites continuously form the electrolytic copper foil from the surface to the back surface of the copper foil. Further, the photograph has confirmed that part of the copper fine particles, which are the fine particles for roughening the surface of the electrolytic copper foil, are fixed to one crystallite constituting the electrolytic copper foil and unify with this crystallite.

Further, a plurality of pores could be observed in the electrolytic copper foil. These pores, which are not present in the electrolytic copper foil before the heating, are formed at the boundary between the adjacent crystallites. In the copper foil and under the heating conditions used in Example 1-1, the pore density was 0.17 pores/μm².

With respect to each of the electrolytic copper foils before and after the heating, an X-ray diffraction (XRD) measurement was conducted. As a result, it was found that, before the heating, the peak intensity ratio I (220)/I (200) of copper in X-ray diffraction was 7.09, and that, after the heating, the ratio was 5.86. The heating treatment in the present invention has a remarkable effect on the copper foil having specific crystalline properties.

As a Comparative Example, the same XRD measurement was conducted with respect to the copper foil which the effect of the heating treatment cannot be obtained. As a result, it was found that, before the heating, the peak intensity ratio I (220)/I (200) of copper in X-ray diffraction was 0.25, and that, after the heating, the ratio was 0.07. Using this copper foil, an electrode for battery and a test lithium-ion secondary battery were prepared in the same manner as in Example 1, and a capacity retention ratio was measured. As a result, it was found that, before the heating, the capacity retention ratio was 76.8% and that, after the heating, the capacity retention ratio was 76.8%, indicating that the heating treatment did not improve the capacity retention ratio.

Preparation and Evaluation of Test Lithium-Ion Secondary Battery

For evaluating the battery performance, a coin-type test lithium-ion secondary battery having the same structure as that of the lithium-ion secondary battery 10 was prepared as follows. The above-obtained electrode for battery was first punched into a circular form having a diameter of 15 mm to form an anode electrode 1. Then, lithium cobaltite ($LiCoO_2$) as a cathode active material, carbon black as a conductor, and polyvinylidene fluoride (PVdF) as a binder were mixed with one another to prepare a composition, and the composition was dispersed in NMP as a dispersing medium to form a composition in a slurry state, and the composition slurry was applied to a cathode current collector 2a made of an aluminum foil, and the dispersing medium was evaporated by drying, followed by compression molding, to form a cathode active material layer 2b, and the resultant foil was punched into a circular form, thus forming a cathode electrode 2.

Then, the anode electrode 1, the separator 3, and the cathode electrode 2 were stacked on one another, and an electrolytic solution was charged to assemble a test lithium-ion secondary battery. As the separator 3, a microporous polypropylene film was used. As the electrolytic solution, there was used a solution obtained by dissolving lithium hexa fluorophosphate ($LiPF_6$) as an electrolyte salt in a mixed solvent of ethylene carbonate (EC) and diethyl carbonate (DEC) in an EC:DEC weight ratio of 30:70 so that the concentration became 1 mol/dm³.

With respect to the test secondary battery prepared, a charge-discharge cycle test was performed to determine a capacity retention ratio. In one cycle of this cycle test, charging was first conducted at a constant current of 1 mA/cm² until the battery voltage reached 4.2 V, and subsequently charging was conducted at a constant voltage of 4.2 V until the current density became 0.1 mA/cm². Then, discharging was conducted at a constant current of 1 mA/cm² until the battery voltage became 2.5 V. This charge-discharge cycle was repeated 50 cycles at room temperature, and a 50th-cycle capacity retention ratio (%) defined by the following formula was determined:

$$\text{50th-Cycle capacity retention ratio(\%)} = \left(\frac{\text{Discharge capacity at the 50th cycle}}{\text{Discharge capacity at the 1st cycle}}\right) \times 100(\%)$$

Example 1-2

In Example 1-2, an electrode for battery was formed in substantially the same manner as in Example 1 except that the temperature of the heating (annealing) was changed from 500° C. to 400° C., and a coin-type test lithium-ion secondary battery was prepared using the electrode formed.

Figure 5:
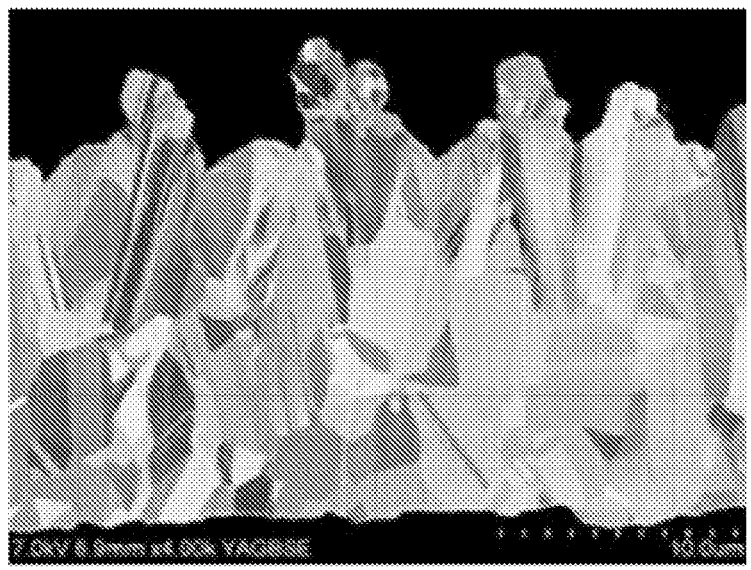
FIG. 5 is a scanning electron photo micrograph of the cross-section of the electrolytic copper foil after the heating in Example 1-2 of the present invention.

FIG. 5 is a photograph of the cross-section structure of an electrolytic copper foil examined under a scanning electron microscope, in which the cross-section is obtained by cutting the electrolytic copper foil after the heating by means of a microtome. From a comparison between the electrolytic copper foil shown in FIG. 5 and the electrolytic copper foil before the heating shown in FIG. 4B, it is apparent that the heating causes the crystallites constituting the electrolytic copper foil to change in size. However, the crystallite average size is about 30 μm² and the pore density is 0.14 pores/μm², and a comparison between the electrolytic copper foil after the heating shown in FIG. 5 and the electrolytic copper foil after the heating in Example 1-1 shown in FIG. 4A has confirmed that the change of structure due to the heating in the present Example is small, as compared to the change in Example 1-1. The cause of this difference is presumed to reside in that the heating temperature of 500° C. was lowered to 400° C.

Comparative Example 1

In Comparative Example 1, an electrode for battery was formed in substantially the same manner as in Example 1 except that the electrolytic copper foil used in Example 1 as an anode current collector material was not subjected to annealing and was used as an anode current collector, and a coin-type test lithium-ion secondary battery was prepared using the electrode formed. The formed electrode for battery was cut by means of a microtome to obtain an exposed cross-section, and the cross-section was observed with respect to the grain size in the electrolytic copper foil, and, as a result, the average size was found to be about 10 μm². The observation has confirmed that grains having a size of 20 μm² or more are not present. Further, the observation has confirmed that no pores are present in the electrode which has not been subjected to heating.

With respect to each of the coin-type test lithium-ion secondary batteries prepared in Examples 1-1 and 1-2 and Comparative Example 1, a 50th-cycle capacity retention ratio (%) was determined, and the following results were obtained.

Example 1-1: 80.3%
Example 1-2: 63.3%
Comparative Example 1: 10.5%

As can be seen from the above results, a preferred temperature of the heating is considered to be 400° C. or higher.

Example 2

In Examples 2-1 to 2-9, electrolytic copper foils having different area ratios of crystallites having a cross-section area of 20 μm² or more were individually prepared by changing the heating temperature and heating time. An electrode for battery was formed in substantially the same manner as in Example 1 except that the above-prepared electrolytic copper foil was used as an anode current collector, and a coin-type test lithium-ion secondary battery was prepared using the electrode formed, and a 50th-cycle capacity retention ratio (%) was determined. The results are shown in Table 1 and FIG. 6.

TABLE 1

|  | Area ratio (%) | Capacity retention ratio (%) |
| --- | --- | --- |
| Example 2-1 | 10 | 43.5 |
| Example 2-2 | 20 | 48.5 |
| Example 2-3 | 30 | 76.5 |
| Example 2-4 | 40 | 79.4 |
| Example 2-5 | 50 | 83.3 |
| Example 2-6 | 60 | 82.9 |
| Example 2-7 | 70 | 83.1 |
| Example 2-8 | 80 | 83.4 |
| Example 2-9 | 90 | 82.9 |

Figure 6:
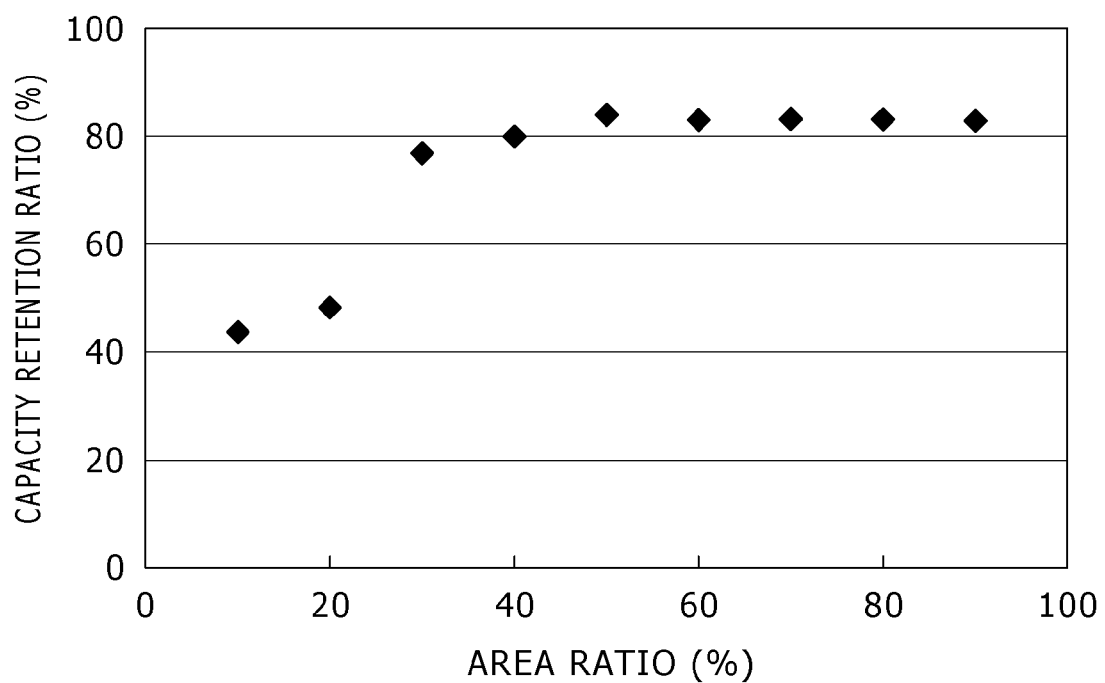
FIG. 6 is a graph showing the relationship between the area ratio of crystallites having a cross-section area of 20 $\mu m^2$ or more and the capacity retention ratio in Example 2 of the present invention.

As can be seen from Table 1 and FIG. 6, when the area ratio of crystallites having a cross-section area of 20 μm² or more is 30% or more, the capacity retention ratio (%) is remarkably improved. Therefore, the area ratio of crystallites having a cross-section area of 20 μm or more is preferably 30% or more.

Examples 3 and 4

In Examples 3 and 4, an electrolytic copper foil having a thickness of 20 μm was first subjected to heating such that the copper foil was kept in an argon gas atmosphere of a calcination furnace at 500° C. for 10 hours to form an anode current collector. In this instance, an electrolytic copper foil having a surface which was not roughened was used in Example 3, and an electrolytic copper foil having a surface roughened was used in Example 4. Then, a tin layer having a thickness of 6 μm was formed on the resultant electrolytic copper foil as an anode active material layer by a plating process, thus forming an electrode for battery. Then, using the electrode formed, a coin-type test lithium-ion secondary battery was prepared in the same manner as in Example 1.

Example 5

In Example 5, an electrolytic copper foil having a surface which was not roughened and having a thickness of 20 μm was first subjected to heating such that the copper foil was kept in an argon gas atmosphere of a calcination furnace at 500° C. for 10 hours to form an anode current collector. Then, a metallic lithium (Li) layer having a thickness of 8 μm was formed on the resultant electrolytic copper foil as an anode active material layer by a vacuum deposition process using a deflecting electron beam evaporation source, thus forming an electrode for battery. Then, using the electrode formed, a coin-type test lithium-ion secondary battery was prepared in the same manner as in Example 1.

Comparative Examples 3 to 5

In Comparative Examples 3 to 5, coin-type test lithium-ion secondary batteries were individually prepared in substantially the same manner as in Examples 3 to 5, respectively, except that the electrolytic copper foil which had not been subjected to heating (annealing) was used.

With respect to each of the batteries prepared in Examples 3 to 5 and Comparative Examples 3 to 5, a 50th-cycle capacity retention ratio (%) was determined. The results are shown in Table 2.

TABLE 2

|  | Active material layer | Deposition method | Roughening for current collector | Treatment for copper foil | Capacity retention ratio (%) |
|---|---|---|---|---|---|
| Example 3 | Sn | Plating | None | Treated | 74.8 |
| Example 4 | Sn | Plating | Roughened | Treated | 79.5 |
| Example 5 | Li | Vapor deposition | None | Treated | 75.3 |
| Comparative Example 3 | Sn | Plating | None | None | 16.7 |
| Comparative Example 4 | Sn | Plating | Roughened | None | 22.4 |
| Comparative Example 5 | Li | Vapor deposition | None | None | 18.3 |

In Examples 6 and 7, according to the process described in the second embodiment, silicon was first deposited as an anode active material on a related art anode current collector material, which had not been subjected to heating, to form a product, and then the product was subjected to heating (annealing) to form an electrode for battery. Using the thus formed electrode for battery as an anode electrode 1, a coin-type test lithium-ion secondary battery having the same structure as that of the lithium-ion secondary battery 10 shown in FIG. 2 was prepared.

Example 6

First, the electrolytic copper foil having a surface roughened by an electrolytic treatment and having a thickness of 20 μm, which was used in Example 1 as an anode current collector material, was not subjected to heating but used as such, and a silicon layer having a thickness of 6 μm was formed on the electrolytic copper foil as an active material layer by a vacuum deposition process using a deflecting electron beam evaporation source, thus forming an electrode structure. Then, the electrode structure formed was subjected to heating (annealing) such that, using an ultra-high temperature infrared heating unit, the electrode structure was heated to 500° C. at a temperature elevation rate of 500° C./minute in an atmosphere of argon gas and kept at 500° C. for one minute, and then cooled to 25° C. at a cooling rate of 500° C./minute, thus forming an electrode for battery. Then, using the electrode formed, a coin-type test lithium-ion secondary battery was prepared in the same manner as in Example 1.

Each of the electrodes before and after the annealing using an ultra-high temperature infrared heating unit was cut by a focused ion beam (FIB) method to obtain an exposed cross-section, and the cross-section of the crystallites was observed. In the electrode annealed, the crystallites in the copper foil were increased in size, and crystallites having a size of 20 μm² or more were observed. Further, the observation has confirmed that part of the crystallites continuously form the copper foil as a current collector from the surface to the back surface of the copper foil. In addition, the observation has confirmed that part of the fine particles for roughening the copper foil, which are the fine particles made of copper or a copper alloy and attached to the surface, are fixed to one crystallite constituting the copper foil and unify with this crystallite.

Further, the electrode was cut by means of a microtome to obtain an exposed cross-section, and the cross-section was observed. Pores were not observed in the electrode before the annealing, but pores were observed in the electrode after the annealing. An average pore density determined by calculation was 0.350 pores/μm².

In the present Example, pores are formed in the copper foil using an ultra-high temperature infrared heating unit, but the method for forming pores is not limited to this method, and the same effect can be obtained by using another processing method which can form similar pores. Examples of other processing methods include a heating treatment using another heating unit, such as a laser heating unit; mechanical processing, such as pulling processing; and a change with time in a special atmosphere, such as a low oxygen-concentration atmosphere. Even when the use of another processing method causes a phenomenon such that pores are locally formed, a satisfactory effect can be obtained.

Comparative Example 6

In Comparative Example 6, like Example 6, the electrolytic copper foil having a surface roughened by an electrolytic treatment and having a thickness of 20 μm was not subjected to heating but used as it is, and a silicon layer having a thickness of 6 μm was formed on the electrolytic copper foil as an active material layer by a vacuum deposition process using a deflecting electron beam evaporation source, thus forming an electrode structure. Then, the electrode structure formed was kept in an argon gas atmosphere of a calcination furnace at 500° C. for 10 hours to form an electrode for battery. Then, using the electrode formed, a coin-type test lithium-ion secondary battery was prepared in the same manner as in Example 1.

The formed electrode for battery was cut by means of a microtome to obtain an exposed cross-section, and the cross-section was observed. In the electrode in Comparative Example 6, another compound layer was observed at part of the interface between the current collector and the silicon layer. With respect to the compound, an elemental analysis was made using an energy dispersive X-ray fluorescence spectrometer (EDX). As a result, it was found that Cu and Si were present in a Cu:Si number ratio of 3:1. An XRD measurement was conducted with respect to the electrode for battery. As a result, a peak of $Cu_3Si$ was observed, which indicates that the compound is $Cu_3Si$. In the electrode in Comparative Example 6, the active material layer was removed from the portion of $Cu_3Si$ at part of the interface.

With respect to each of the coin-type test lithium-ion secondary batteries prepared in Example 6 and Comparative Example 6, a 50th-cycle capacity retention ratio (%) was determined. The results are shown in Table 3.

TABLE 3

| | Active material layer | Deposition method | Roughening for current collector | Treatment for copper foil | Pore density (pores/μm$^2$) | Capacity retention ratio (%) |
|---|---|---|---|---|---|---|
| Example 6 | Sn | Vapor deposition | Roughened | 500° C., 1 min | 0.350 | 80.1 |
| Comparative Example 6 | Sn | Vapor deposition | Roughened | 500° C., 10 hr | 0.17 | 10.5 |

When the active material layer is formed and then subjected to heating for a short time as shown in Example 6, the effect almost similar to that obtained in Example 1 is obtained. When the heating is conducted for too long a time as shown in Comparative Example 6, alloying of the current collector and the active material layer proceeds to excess, making it difficult to obtain an excellent capacity retention ratio (%)

Example 7

Example 7 is an example in which the conditions of the ultra-high temperature infrared heating unit used for heating the electrode structure obtained in Example 6 are changed to obtain different crystallite sizes in the copper foil. A secondary battery was prepared in the same manner as in Example 1 using the obtained electrode for battery, and a 50th-cycle capacity retention ratio was measured. The results are shown in Table 4.

TABLE 4

| | Atmosphere | Conditions of ultra-high temperature infrared heating unit | Pore density (pores/μm$^2$) | Capacity retention ratio (%) |
|---|---|---|---|---|
| Example 7-1 | N$_2$ | Elevated to 380° C. (500° C./min), kept at 380° C. (1 min), and lowered to 25° C. (500° C./min) | 0.0008 | 80.1 |
| Example 7-2 | N$_2$ | Elevated to 400° C. (500° C./min), kept at 400° C. (1 min), and lowered to 25° C. (500° C./min) | 0.001 | 84.3 |
| Example 7-3 | Ar | Elevated to 400° C. (500° C./min), kept at 400° C. (2 min), and lowered to 25° C. (500° C./min) | 0.005 | 83.2 |
| Example 7-4 | Ar | Elevated to 420° C. (500° C./min), kept at 420° C. (2 min), and lowered to 25° C. (500° C./min) | 0.010 | 85.6 |
| Example 7-5 | Ar | Elevated to 450° C. (500° C./min), kept at 450° C. (1 min), and lowered to 25° C. (500° C./min) | 0.060 | 84.3 |
| Example 7-6 | Ar | Elevated to 500° C. (500° C./min), kept at 500° C. (0.5 min), and lowered to 25° C. (500° C./min) | 0.180 | 84.7 |
| Example 6 | Ar | Elevated to 500° C. (500° C./min), kept at 500° C. (1 min), and lowered to 25° C. (500° C./min) | 0.350 | 80.1 |

Example 8

In Example 8, the electrode for battery prepared in Example 6 was further subjected to annealing in a general vacuum furnace at 120° C. for 10 hours to form an electrode. With respect to the electrode prepared in Example 8, elemental distribution was measured by EDX and compared to that of the electrode for battery prepared in Example 6. As a result, the EDX measurement has confirmed that, in at least part of the interface region between the copper foil as the electrode current collector and the silicon layer as the active material layer, silicon atoms of the silicon layer at the interface diffuse into the crystallite which constitutes the copper foil and unifies with the fine particles.

Then, using the above-prepared electrode, a secondary battery was prepared in the same manner as in Example 1, and a 50th-cycle capacity retention ratio was measured. The results are shown in Table 5.

TABLE 5

| | Vacuum furnace annealing | Comment | Capacity retention ratio (%) |
|---|---|---|---|
| Example 8 | 120° C., 10 hr | Diffusion of silicon atoms found at interface | 85.6 |
| Example 6 | None | No diffusion of elements found at interface | 80.2 |

As can be seen from Table 5, the capacity retention ratio in Example 8 was improved, as compared to that in Example 6. The reason for this is presumed that the silicon atoms at the interface diffuse into the crystallite to an appropriate extent, thus making strong the bonding between the anode active material layer and the anode current collector layer.

Example 9

In Examples 9-1 to 9-5, electrodes for battery were individually formed in substantially the same manner as in Example 6 except that the oxygen gas feed rate during the deposition of silicon was changed and the degree of vacuum and the oxygen partial pressure were changed to obtain electrodes for battery having different oxygen contents of the anode active material layer. The oxygen content was measured by EDX. In Example 9-6, a silicon layer having a thickness of 3 μm was formed in the same manner as in Example 6, and then oxygen gas was introduced into the chamber to oxidize the surface of the silicon layer and then, another silicon layer was deposited thereon, thus introducing one layer of a region having a larger oxygen concentration to the silicon layer. In Example 9-7, the same operation was repeated twice to form one layer of a region having a larger oxygen concentration on the surface and two layers of the region in the silicon layer.

Then, using the above-formed electrode for battery, a secondary battery was prepared in the same manner as in Example 1, and a 50th-cycle capacity retention ratio was measured. The results are shown in Table 6.

TABLE 6

| Oxygen content (atomic %) | | Oxygen distribution | Capacity retention ratio (%) |
| --- | --- | --- | --- |
| Example 6 | 3.2 | Uniformly dispersed in film | 80.2 |
| Example 9-1 | 4.9 | Uniformly dispersed in film | 80.2 |
| Example 9-2 | 5 | Uniformly dispersed in film | 83.4 |
| Example 9-3 | 20 | Uniformly dispersed in film | 86.4 |
| Example 9-4 | 40 | Uniformly dispersed in film | 87.1 |
| Example 9-5 | 40.1 | Uniformly dispersed in film | 80.2 |
| Example 9-6 | 20 | One oxygen layer at intermediate layer | 87.6 |
| Example 9-7 | 20 | One layer on film surface, and two layers in bulk | 88.9 |

As can be seen from Table 6, when oxygen is contained in the active material and the oxygen content is 5 to 40 atomic %, the capacity retention ratio is advantageously improved. With respect to the oxygen distribution, in the same oxygen content, the improvement achieved when a layer having a larger oxygen content and a layer having a smaller content are stacked on one another is more remarkable than the improvement achieved when oxygen is uniformly distributed in the active material layer, and the larger the number of the layers stacked, the more remarkable the improvement.

Example 10

In Examples 10-1 and 10-2, secondary batteries were individually prepared in substantially the same manner as in Example 6 except that, instead of ethylene carbonate (EC) as a solvent for electrolyte, fluoroethylene carbonate (FEC) and difluoroethylene carbonate (DFEC) were respectively used, and a 50th-cycle capacity retention ratio was measured. The results are shown in Table 7. The changes of the solvent improved the capacity retention ratio by about 10%.

TABLE 7

| | Electrolyte composition | Capacity retention ratio (%) |
| --- | --- | --- |
| Example 10-1 | FEC:DEC = 3:7 (EC→FEC) | 88.9 |
| Example 10-2 | DFEC:DEC = 3:7 (EC→DFEC) | 89.7 |
| Example 6 | EC:DEC = 3:7 | 80.2 |

Example 11

In Example 11, a secondary battery was prepared using propenesultone as an additive for the electrolytic solution used in Example 6, and a 50th-cycle battery expansion ratio and a 50th-cycle capacity retention ratio were measured. The results are shown in Table 8. The addition of propenesultone reduced the battery expansion ratio, and improved the capacity retention ratio by about 5%.

TABLE 8

| | Propenesultone | Expansion ratio (%) | Capacity retention ratio (%) |
| --- | --- | --- | --- |
| Example 11 | Contained | 0.40 | 85.3 |
| Example 6 | None | 3.00 | 80.2 |

The present invention is described above with reference to the Examples, and, in the method in Examples 1 to 5 in which a current collector is subjected to heating before an active material layer is formed on the current collector, the current collector can be subjected to heating under the most desirable conditions without adversely affecting the active material layer, and therefore this method is the basic mode of the heating treatment in the present invention. When it is possible to prevent an unfavorable phenomenon such that, e.g., alloying proceeds to excess at the interface between the active material layer and the current collector, a current collector having the similar performance can be produced even by the method in Examples 6 and 7 in which an active material layer is formed on a current collector and then the resultant current collector is subjected to heating. In this case, it is desired to use a heating means that enables rapid heating and rapid cooling, such as an ultra-high speed infrared heating unit. In the method in which an active material layer is formed on a current collector and then the resultant current collector is subjected to heating, as shown in Comparative Example 6, heating for a long time or the like may cause an unfavorable phenomenon, e.g., cause alloying to proceed to excess at the interface between the active material layer and the current collector, thus lowering the cycle characteristics.

Hereinabove, the present invention is described with reference to the embodiments and Examples, but the present invention is not limited to the above embodiments and Examples, and can be changed or modified.

For example, in the above embodiments and Examples, the use of a rectangular can as a packaging member is described, but, in the present invention, a film packaging material or the like can be used as a packaging member, and the packaging material may have any form of cylinder, rectangle, coin, and button or may be of a thin type or large size.

The present application contains subject matter related to Japanese Patent Application JP 2006-174763 filed in the Japanese Patent Office on Jun. 26, 2006, the entire content of which being incorporated herein by reference.

It should be understood by those skilled in the art that various modifications, combinations, sub-combinations and alterations may occur depending on design requirements and other factors insofar as they are within the scope of the appended claims or the equivalents thereof.

INDUSTRIAL APPLICABILITY

The secondary battery of the present invention uses a simple substance of silicon or tin as an anode active material, and hence achieves both large energy capacity and excellent cycle characteristics, thus enabling mobile electronic devices to be reduced in size, weight, and thickness and improved in usefulness.

What is claimed is:

1. A current collector electrode for a battery, the current collector comprising:
   a conductive layer made of an electrolytic foil which comprises copper or a copper alloy; and
   a plurality of pores and crystallites in the conductive layer, wherein,
   an area ratio of crystallites having a cross-section area of 20 μm² or more is 30% to 90%, both inclusive.

2. The electrode current collector according to claim 1, wherein the crystallites contain crystallites having a cross-section area of 50 μm² or more.

3. The electrode current collector according to claim 1, wherein:
   the pores include pores having a pore diameter of 0.5 to 3.0 μm, and
   the pores are present in the conductive layer at an average pore density of 0.01 to 0.05 pores/μm² in an arbitrary cross-section of the conductive layer.

4. The electrode current collector according to claim 1, wherein at least part of the pores are present in a portion of the crystallites joined to other crystallites.

5. The electrode current collector according to claim 1, wherein at least part of the pores surrounding the crystallites are smaller than the crystallites and have a pore diameter of 0.01 to 10 μm.

6. The electrode current collector according to claim 1, wherein the conductive layer includes a crystallite that extends from front surface of the conductive layer to the back surface of the conductive layer.

7. The electrode current collector according to claim 1, wherein
   fine particles made of copper or a copper alloy are affixed to a surface of the conductive layer,
   the fine particles are effective to create a surface roughness on the surface of the conductive layer, and
   at least part of the fine particles are fixed to one crystallite included in the conductive layer.

8. The electrode current collector according to claim 1, wherein the conductive layer is made of an electrolytic copper foil treated by heating.

9. The electrode current collector according to claim 8, wherein the electrolytic copper foil has a diffraction peak intensity ratio of copper in an X-ray diffraction measurement that is I (220)/I (200)>1.

10. The current collector according to claim 1 wherein the electrolytic foil exhibits an X-ray diffraction spectrum in which the ratio of an intensity I (220) of a peak ascribed to the (220) crystal face diffraction to an intensity I (200) of a peak ascribed to the (200) crystal face diffraction is I (220)/I (200)>1.

11. The current collector according to claim 1 wherein the conductive conductor layer is formed by heating the conductive layer at a temperature of 400° C. or higher within 5 minutes.

12. The current collector according to claim 1 wherein the pores are present in the conductive layer at an average pore density of 0.001 to 1.00 pores/μm² in an arbitrary cross-section of the conductive layer.

13. The current collector according to claim 1 wherein the electrolytic foil is formed by an electrolytic process and then roughened by immersion in an electrolytic bath.

14. A current collector electrode for a battery, the current collector comprising:
   a conductive layer made of an electrolytic copper foil which comprises a copper or a copper alloy; and
   crystallites in the conductive layer,
   wherein,
   the crystallites have a cross-section area of 20 μm² or more in an area ratio of 30% to 90%, both inclusive of the electrolytic foil.

15. An electrode for battery including the electrode current collector according to any one of claims 1, 14, 2 or 3 to 9.

16. The electrode for battery according to claim 15, wherein, the active material layer contains at least one substance selected from the group consisting of metallic lithium, metallic tin, a tin compound, a silicon simple substance, and a silicon compound.

17. The electrode according to claim 16, wherein, in at least part of the interface region between the electrode current collector and the active material layer, crystallites in which the material of the electrode current collector and the material of the active material layer diffuse into each other are present.

18. The electrode for battery according to claim 17, wherein the active material layer is made of silicon.

19. The electrode for battery according to claim 18, wherein the active material layer contains oxygen in an amount of 3 to 40 atomic %.

20. The electrode for battery according to claim 19, wherein the active material layer has a region having a high oxygen concentration, the region of high oxygen concentration distributed in substantially the longitudinal direction of the electrode current collector.

21. A secondary battery comprising an electrode for battery according to claim 15, wherein the electrode is an anode electrode.

22. The secondary battery according to claim 21, wherein the secondary battery is a lithium secondary battery.

23. The secondary battery according to claim 22, further comprising:
   an electrolyte containing a solvent obtained by fluorinating part of or all of hydrogens of at least one carbonate selected from a cyclic carbonate and a chain carbonate.

24. The secondary battery according to claim 23, wherein the electrolyte contains propene sultone.

25. The current collector according to claim 14 wherein the electrolytic foil is formed by an electrolytic process and then roughened by immersion in an electrolytic bath.

26. A method for producing an electrode current collector comprising the steps of:
   forming a conductor layer comprising a copper or copper alloy by an electrolytic process and then immersing the conductor layer in an electrolytic bath; and
   heating the conductor layer,
   wherein,
   the conductive layer has a plurality of crystallites; and
   an area ratio of the heated crystallites having a cross-section area of 20 μm or more is 30% to 90%, both inclusive.

27. The method according to claim 26, wherein the heating is conducted in an atmosphere of chemically inert gas.

28. The method for producing the electrode for battery according to claim 26 further comprising the step of forming an active material layer on the electrode current collector.

29. The method for producing the electrode for battery according to claim 26 further comprising the step of:

forming an active material layer on the conductor layer; and then heating the conductor layer and the active material layer to form the conductive layer.

30. The method for producing an electrode current collector according to claim 26 further comprising the step of heating the conductor layer to form a conductive layer at a temperature of 400° C. or higher within 5 minutes.

31. The method for producing an electrode current collector according to claim 26 wherein the copper exhibits an X-ray diffraction spectrum in which the ratio of an intensity I (220) of a peak ascribed to the (220) crystal face diffraction to an intensity I (200) of a peak ascribed to the (200) crystal face diffraction is I (220)/I (200)>1.

* * * * *